(12) United States Patent
Kaura et al.

(10) Patent No.: US 7,082,308 B1
(45) Date of Patent: Jul. 25, 2006

(54) HLR MATED-PAIR AUTO CUTOVER

(75) Inventors: Ricky Kaura, Uxbridge (GB); Stephen Bird, Maidenhead (GB); Alan G Darbyshire, Oxford (GB); Hock Gan, Potters Bar (GB)

(73) Assignee: Nortel Networks Limited, St. Laurent (CA)

( * ) Notice: Subject to any disclaimer, the term of this patent is extended or adjusted under 35 U.S.C. 154(b) by 453 days.

(21) Appl. No.: 10/323,411

(22) Filed: Dec. 18, 2002

(51) Int. Cl.
*H04Q 7/20* (2006.01)

(52) U.S. Cl. .................... 455/445; 455/423; 455/422.1

(58) Field of Classification Search ................ 455/445, 455/560, 426.1, 433, 432.3, 432.5, 403, 423, 455/435.2; 379/221.01, 221.03, 219
See application file for complete search history.

(56) References Cited

U.S. PATENT DOCUMENTS

| | | | | |
|---|---|---|---|---|
| 5,548,533 A * | 8/1996 | Gao et al. .................... 709/235 |
| 5,623,532 A * | 4/1997 | Houde et al. ............... 455/445 |
| 5,839,064 A * | 11/1998 | Foti ........................... 455/413 |
| 5,953,662 A * | 9/1999 | Lindquist et al. ........... 455/433 |
| 5,963,662 A * | 10/1999 | Vachtsevanos et al. ..... 382/150 |
| 6,408,182 B1 * | 6/2002 | Davidson et al. ........... 455/433 |
| 6,678,369 B1 * | 1/2004 | DeMent et al. ........ 379/221.03 |
| 6,751,191 B1 * | 6/2004 | Kanekar et al. ............ 370/217 |

* cited by examiner

*Primary Examiner*—Sonny Trinh
(74) *Attorney, Agent, or Firm*—Barnes & ThornburgLLP

(57) ABSTRACT

A location register for a mobile communications network is coupled by an SS7 network for passing messages, has a mated location register at a different location to provide geographical redundancy, and has a status detector for detecting a status of the associated register, by sending a heartbeat message to the associated register. It deduces a fail if the message is returned by the signaling network. A cutover manager is arranged to enable a cutover on the basis of at least the detected status. By providing a more positive detection of a failure than merely passively interpreting a lack of response to the heartbeat, false triggering of cutovers owing to transient failures or temporary congestion, can be reduced. The cutover manager can verify the status by sending other messages by other routes, or using other criteria.

14 Claims, 9 Drawing Sheets

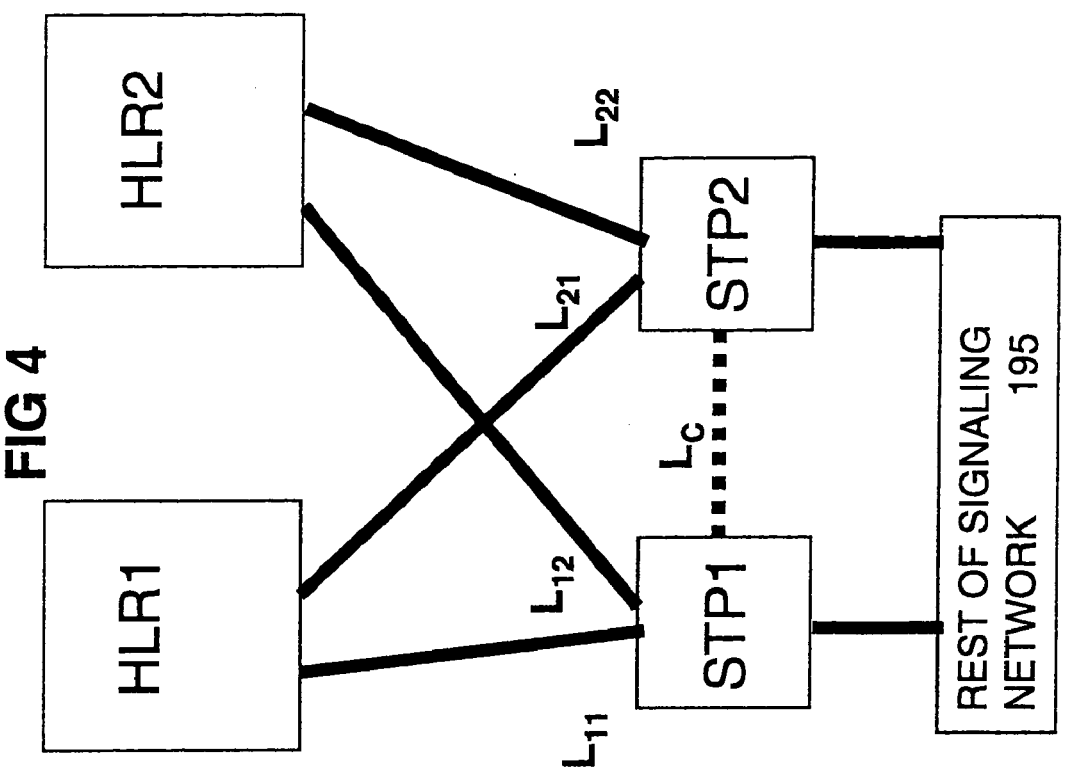
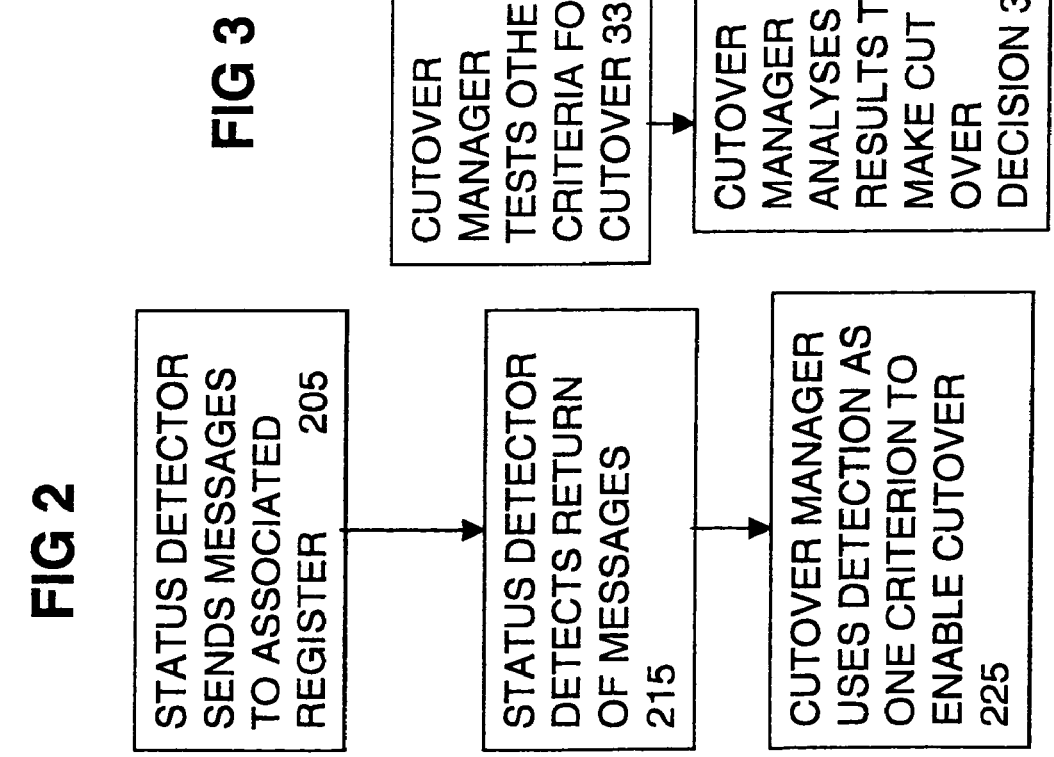

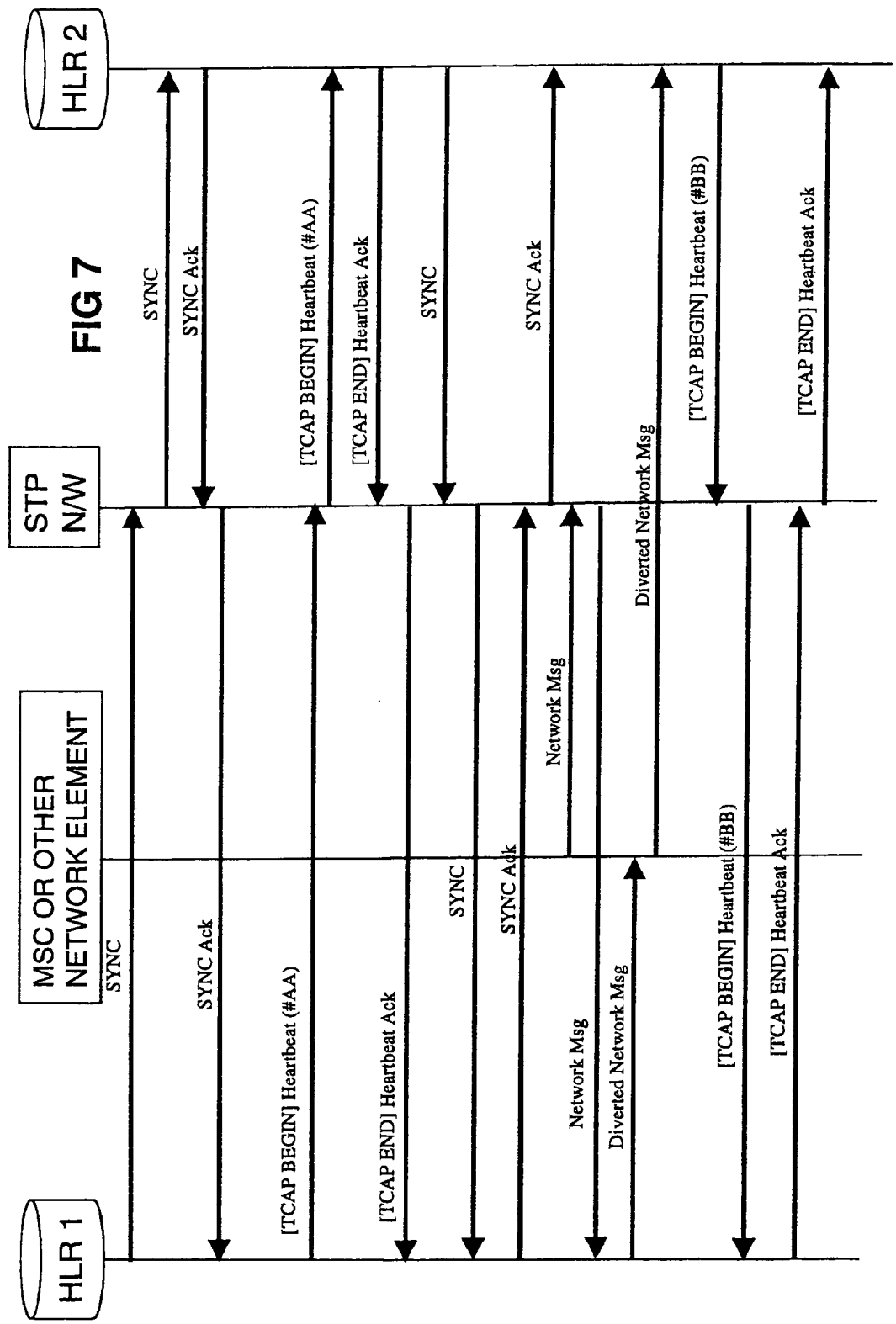

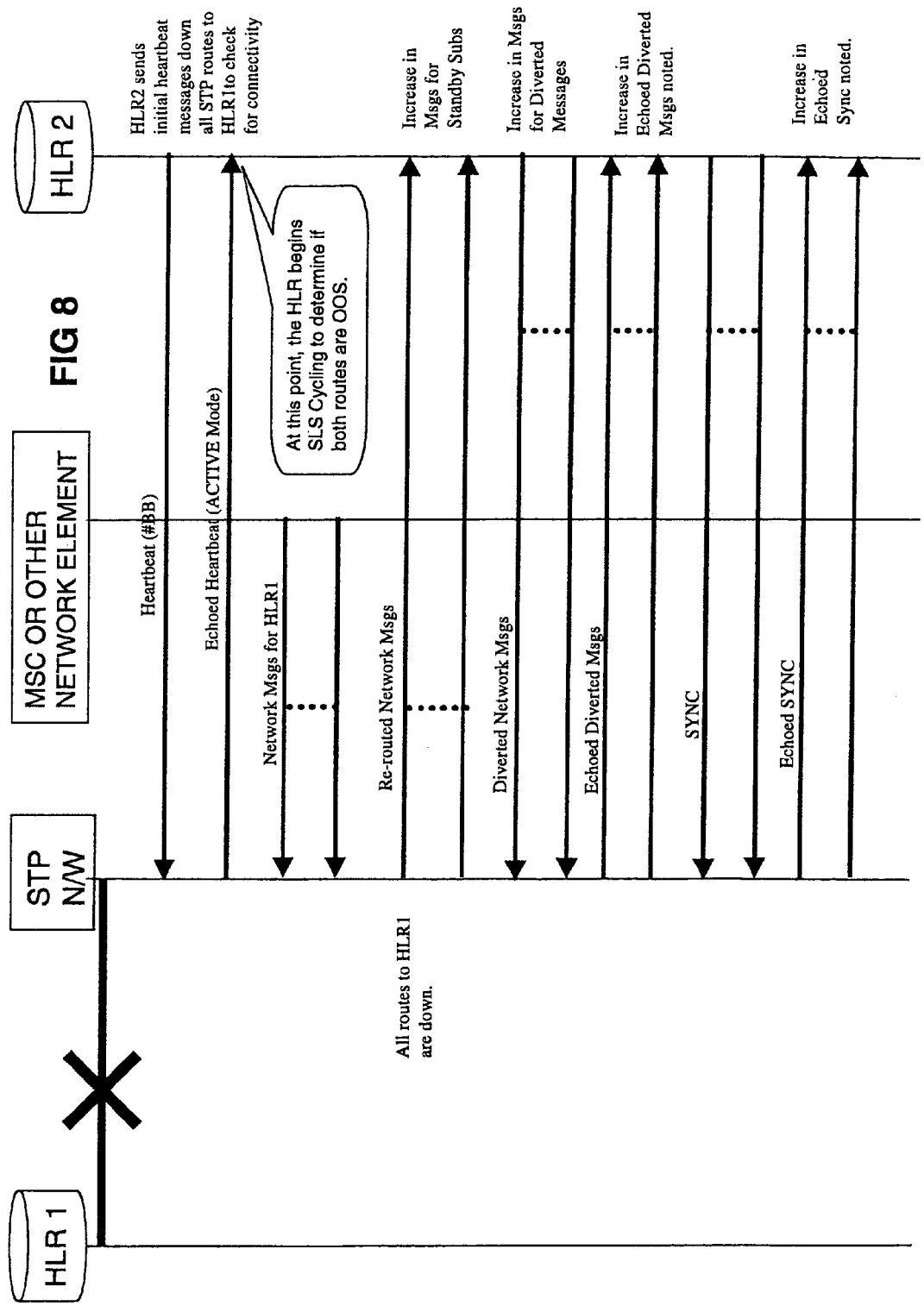

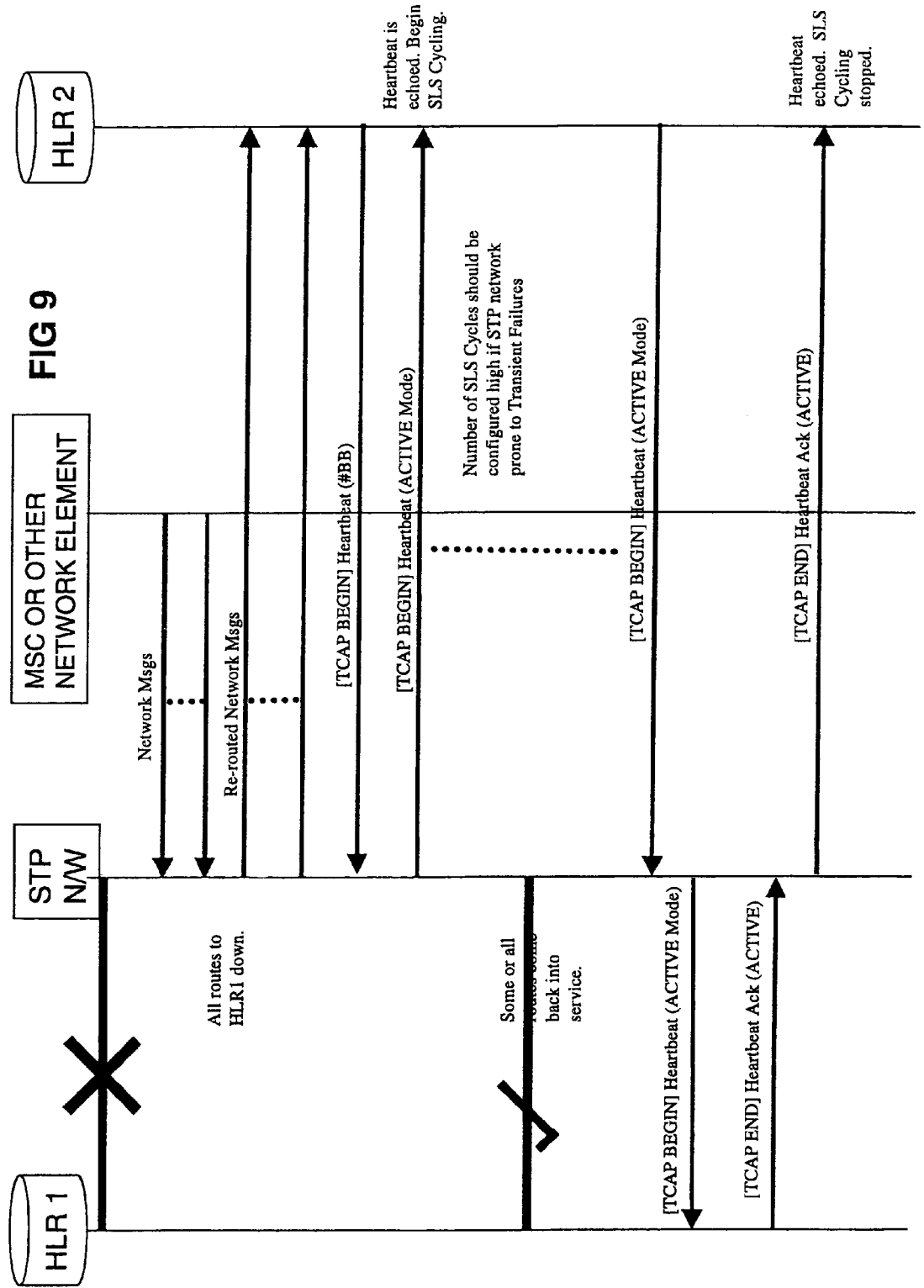

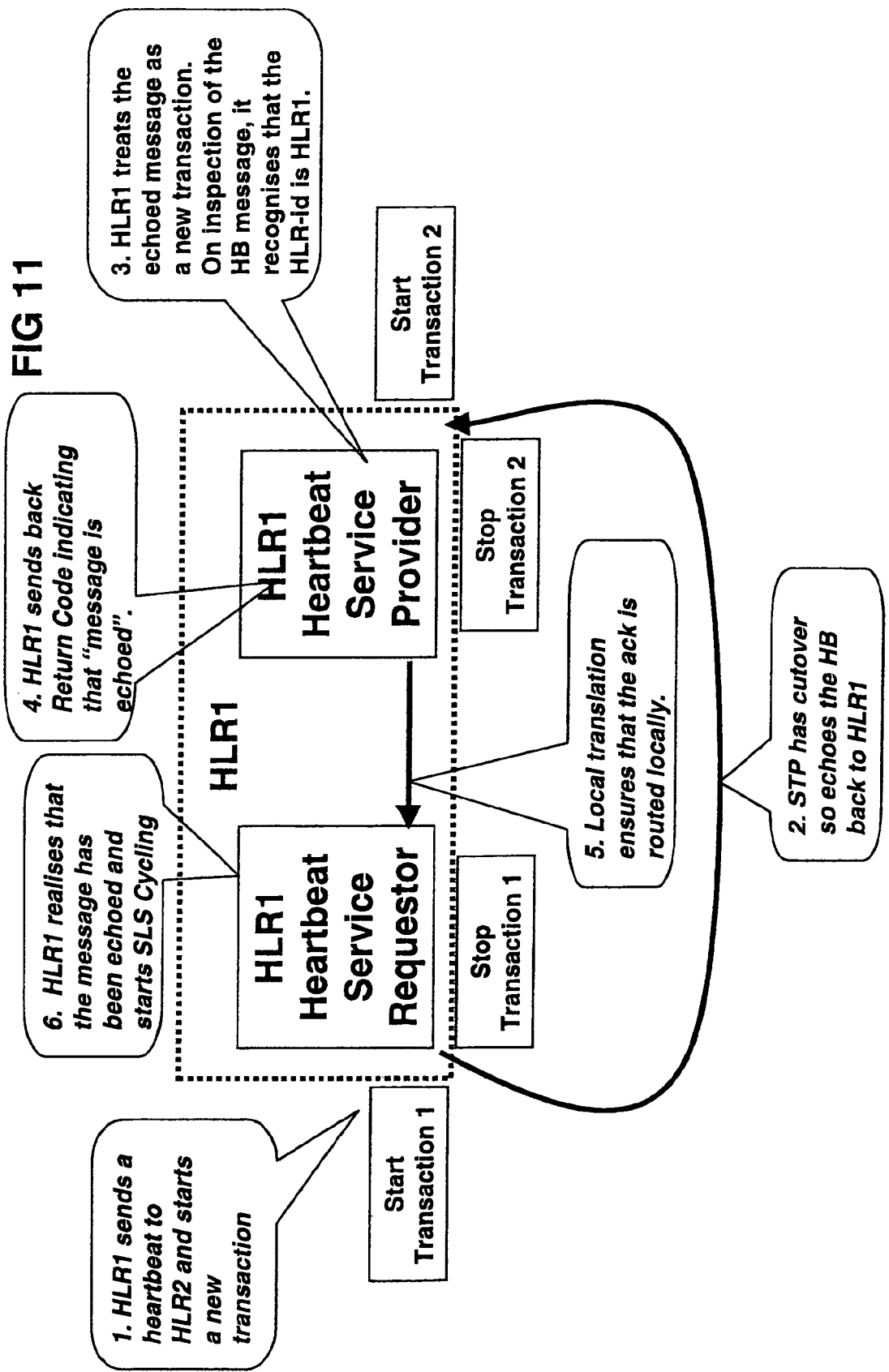

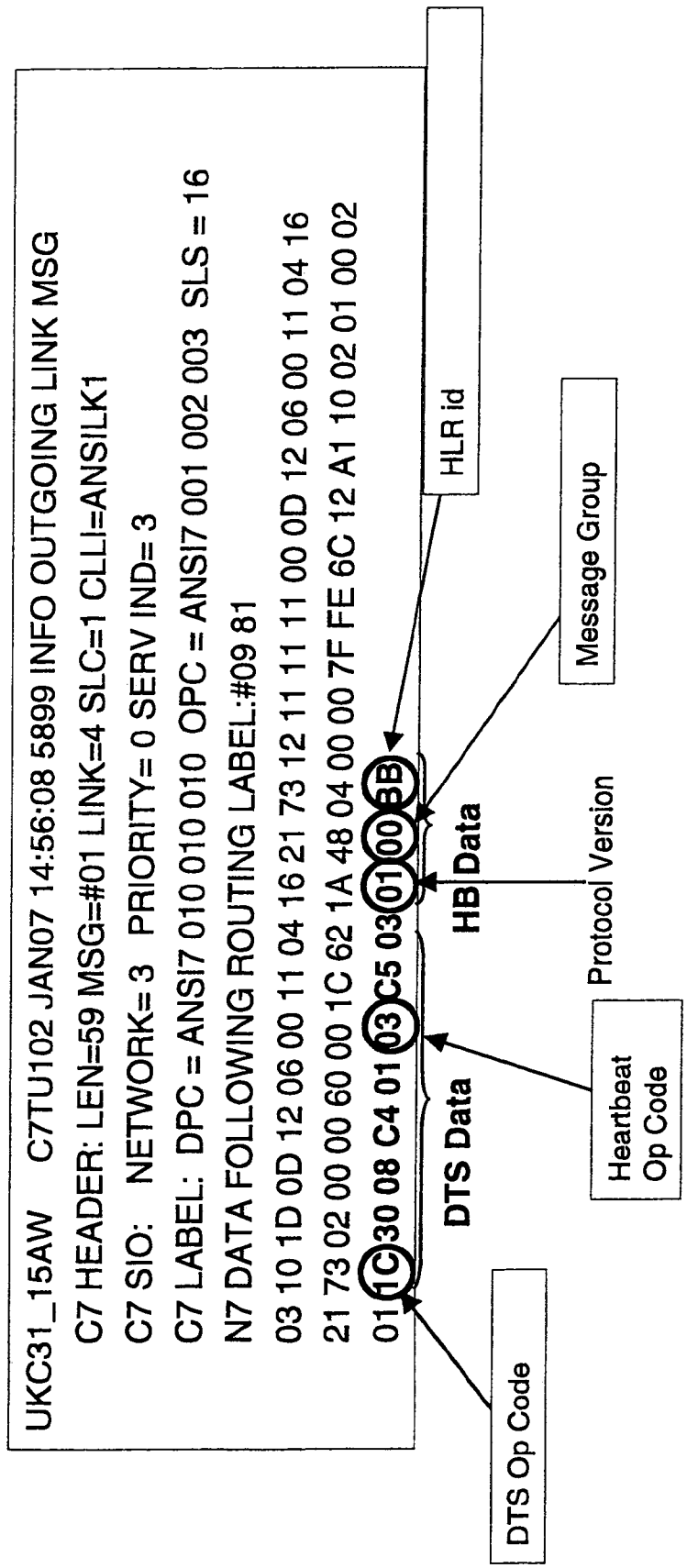
FIG 12 Heartbeat message

HLR MATED-PAIR AUTO CUTOVER

FIELD OF THE INVENTION

This invention relates to registers for mobile communications networks, to networks having such registers, and to methods of offering a communication service over such networks.

BACKGROUND TO THE INVENTION

Mobile telephone networks typically include a mobile switching center MSC and a number of registers in the form of databases accessed during the establishment of a telephone call connection or other events in the network. These databases include a home location register HLR and a visitor location register VLR. They store both static (i.e., non-changing) and dynamic (i.e., changing) data related to the subscribers. The static data includes, for example, a list of identifiers of cooperating exchanges interconnected with the mobile switching center, an identification of the services permitted for each subscriber, and parameters for such services. The dynamic data can include, for example, subscriber defined service data such as preferences, mobile station location data, and mobile station activity data.

The HLR contains data needed to establish a telephone connection within the mobile telephone network, so any failure of the HLR will deprive a substantial number of subscribers of service, and correspondingly affect operator revenue. Conventionally, the hardware and software is arranged for high reliability and availability, typically using mirroring techniques and local backup storage. To give some geographical redundancy, each HLR is often coupled to another HLR at a different location, to create a mated pair and the load is split between them, often but not necessarily, in 50—50 proportion. If one has all or the majority of the load, it is referred to as the master HLR, and the other as the slave. The two HLRs are located with sufficient geographical separation to provide resilience to local events such as floods or earthquakes. In the case of a disaster affecting one of them, they are designed to have sufficient capacity for one to handle the entire load. This requires a cutover operation. A GSM/GPRS/UMTS (Global system mobile)/(General Packet Radio Service)/(Universal Mobile Telecommunication System) HLR Mated-Pair Disaster Cutover (also referred to as failover) involves an HLR in a mated-pair arrangement detecting that it's mate HLR has undergone a "disaster" and then "switching over" to provide an active service for the subscribers belonging to the mate HLR (as well as continuing to provide an active service for its set of home subscribers).

Note that the word "disaster" in this context refers to one of the following:

a) one of the HLRs in a mated-pair becomes inaccessible (Total Route Failure) i.e. all network communication is lost to one of the HLRs, and b) one of the HLRs in a mated-pair goes out of service (Nodal Failure) e.g. caused as a result of a natural phenomena (e.g. Earthquake).

A Mated-Pair Product which uses a Manual cutover mechanism has its limitations in that manual decisions can delay the time to cutover and subsequently may result in a temporary loss of service. A Manual Cutover mechanism has essentially two categories of procedures:

1. Disaster Detection—During Manual Disaster Detection, the operator has to rely on supporting information to assist with the decision to declare a Cutover. This could include potentially some or all of the following:

Manually examine logs generated and alarms raised on the surviving HLR.

Phone calls between Operators (HLR, STP [Signalling Transfer Point])

Increase in SCCP (Signaling connection control part) Maintenance messages, etc.

Manually work out if the HLR is isolated or not.

2. Disaster Cutover—During Manual Disaster Cutover, the operator has to modify some disaster standby configuration data to declare that the HLR is operating Standalone. Also the Operator has to manually run any procedures for aligning operational measurements, etc.

U.S. Pat. No. 5,623,532 discloses a system where two HLRs support each other to provide geographical redundancy, via an SS7 (Signaling System No. 7) telecommunications network without the need for additional links or interface modules between the two mated HLRs. The two HLRs, are connected through the same two Signal Transfer Points (STPs). Each node in a SS7 telecommunications network is supported by dual STPs. In case the first STP or links between the first STP and the destination node fails, the second STP is utilized to provide reliable network operation by passing the messages for the failed HLR to its paired HLR. Determination of failure of an HLR is made manually by an administrator, or by the STPs, not by the paired HLR. The two HLRs do not monitor each other. This patent does not show distinguishing signals communicated between the two HLRs and signals received from other nodes over the network.

U.S. Pat. No. 5,953,662 also shows having two HLRs located anywhere within the SS7 network and supporting each other in real time without requiring additional communications links between the two and without destroying the integrity of the data base. This patent goes further than the '532 patent in that it shows the HLRs sending messages to each other over the SS7 network. One use for such messages is for a first HLR to update the contents of its data base to conform to that of its paired HLR so that it can take over at any time from the paired HLR, and vice versa. The actual transmission is achieved over the same SS7 telecommunications network utilizing the same Signal Transfer Points (STPs).

The HLRs also monitor each other for failure by sending occasional heartbeat messages to each other. A lack of response to a heartbeat is interpreted by a first HLR as indicating a failure of the other HLR. As the lack of response lasts longer, the perceived failure status of the paired HLR is upgraded from temporarily out of contact to inoperable. As before, should the other HLR fail, signals from other entities intended for the other HLR are rerouted by the local STP of the SS7 network to the first HLR for processing.

However there are a number of drawbacks with relying on lack of responses to heartbeats. In particular, lack of response can be caused by congestion, and lead to unwanted cutover.

SUMMARY OF THE INVENTION

It is an object of the present invention to provide improved apparatus and methods. According to a first aspect of the present invention, there is provided a register for a mobile communications network having a signaling network for passing messages, the register being associated with another register at a different location to provide redundancy, and having:

a status detector arranged to detect a status of the associated register, by sending a message to the associated register and detecting if the message is returned by the signaling network, and a cutover manager arranged to enable a cutover on the basis of at least the detected status of the associated register.

Compared to the '532 patent, this aspect is notable for having the detector passing messages between the registers, and for having the cutover determined locally at the register, rather than by an administrator. Compared to the '662 patent, this aspect is notable for providing a more positive detection of a failure than merely passively interpreting a lack of response to the status message. This can help avoid the problem of failures in the receiving path of the register being misinterpreted as a problem with the associated register. This can be used in conjunction with other criteria, such as an increase in traffic redirected to the node, for subscribers not normally resident on that register. The messages can be "heartbeat" messages as described below, or other messages achieving a similar function.

An additional feature of some embodiments is the register being arranged to confirm the status of the associated register by sending another message by another route.

This is useful to avoid unnecessary triggering of a cutover, in case the signaling network has not tried all the routes to the associated register, or in case there has been a transient failure of the associated register or of part of the signaling network for example.

An additional feature of some embodiments is the register being arranged to try sending messages by all other links on all routes to the associated register in the event of a message being returned as undelivered.

This technique known as "cycling" can provide confirmation that the associated register is down and out of contact, and reduce the incidence of unwanted cutovers.

An additional feature of some embodiments is the cutover manager being arranged to determine whether to cutover according to other criteria including at least one of the following: signaling network failures, network congestion, isolation of the register from the signaling network, transient failures, and manual disabling of cutover.

An additional feature of some embodiments is the register being configurable to adjust how many returned messages are needed before the cutover is enabled.

This can enable the register to be customized to suit the signaling network, and minimize the number of unnecessary cutovers, or minimize a delay before a justified cutover. Different signaling networks or parts of the same network may not return all unsuccessful messages for various reasons.

An additional feature of some embodiments is a configurable delay before the cutover is initiated.

This can also enable the register to be customized to suit the signaling network, and minimize the number of unnecessary cutovers, or minimize a delay before a justified cutover. Different signaling networks or parts of the same network may be characterized as suffering transient failures of particular durations, and times to return unsuccessful messages may be characteristic of the network or part of the network for various reasons.

An additional feature of some embodiments is the message having an indication of the identity of the sending register.

This can help the register recognize the returned "heartbeat" messages.

An additional feature of some embodiments is the message having an application part and a signaling transfer part, the identity being contained in application part.

This enables application software rather than ss7 software to recognize and use the identity. This can conveniently be included as a proprietary addition to a standard TCAP (Transaction Capabilities Application Part) message.

An additional feature of some embodiments is the signaling network being an SS7 network, having one or more signaling transfer points, and the signaling address being a signaling point code.

Such networks are universal. An advantage of such networks is that the STPs act as a hub, relieving the register of the overhead of maintaining records of all the MSCs it might need to communicate with. For anything but small networks, or those with limited support for roaming, this could be an impractical overhead. Ideally the register and associated register should be coupled to a pair of STPs with no intermediate nodes. Otherwise the intermediate nodes might need to be configured appropriately, to ensure status messages are transmitted.

An additional feature of some embodiments is the register being arranged to respond to a status message from the associated register by sending a status acknowledgement message including status information.

Such acknowledgements can be useful for determining that cutover is not needed or that heartbeat messages should stop, or other actions taken. By including status information, the decision can be based on more information.

An additional feature of some embodiments is the register being a home location register, for processing subscriber messages.

Another aspect of the invention provides a register for a mobile communications network having a signaling network for passing messages, the register being associated with another register at a different location to provide redundancy, and having:

a status detector arranged to detect a status of the associated register, by sending a message to the associated register, then if the message is not acknowledged, verifying the status in a different manner, and a cutover manager arranged to enable a cutover on the basis of at least the detected and verified status of the associated register.

By verifying the status in a different manner, such as sending messages by other routes, or detecting signaling network failures, detecting network congestion or detecting the register is isolated, again, falsely triggered cutovers can be reduced.

Another aspect of the invention provides a network having the register as set out above.

Another aspect of the invention provides a method of offering a mobile communications service to subscribers using a network having the register set out above.

As the advantages of the register can enable a better system or network, which is more reliable or more cost effective for example, consequently this can be reflected in a correspondingly improved service over the network, and hence the value of such services can increase. Such increased value over the life of the system, could prove far greater than the sales value of the equipment.

Another aspect of the invention provides software for implementing the register. This acknowledges that software can be a valuable, separately tradable commodity. It is intended to encompass software which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Any of the additional features can be combined with any other of the additional features or aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 2 shows steps in the operation of the status detector and cutover manager, according to an embodiment, FIG. 3 shows steps in the operation of the cutover manager, according to an embodiment, FIG. 4 shows an embodiment in the context of an SS7 signaling network having STPs coupled to each of the registers, FIG. 7 shows a sequence chart showing examples of messages sent in normal operation, FIG. 8 shows a sequence chart showing examples of messages sent when all routes to one of the HLRs are out of service, FIG. 9 shows a sequence chart showing examples of messages sent when all routes to one of the HLRs are out of service for a short time, a transient failure, FIG. 11 shows the operation of the status detector, and FIG. 12 shows an example of a heartbeat message.

DETAILED DESCRIPTION OF PREFERRED EMBODIMENTS

Figure 1:
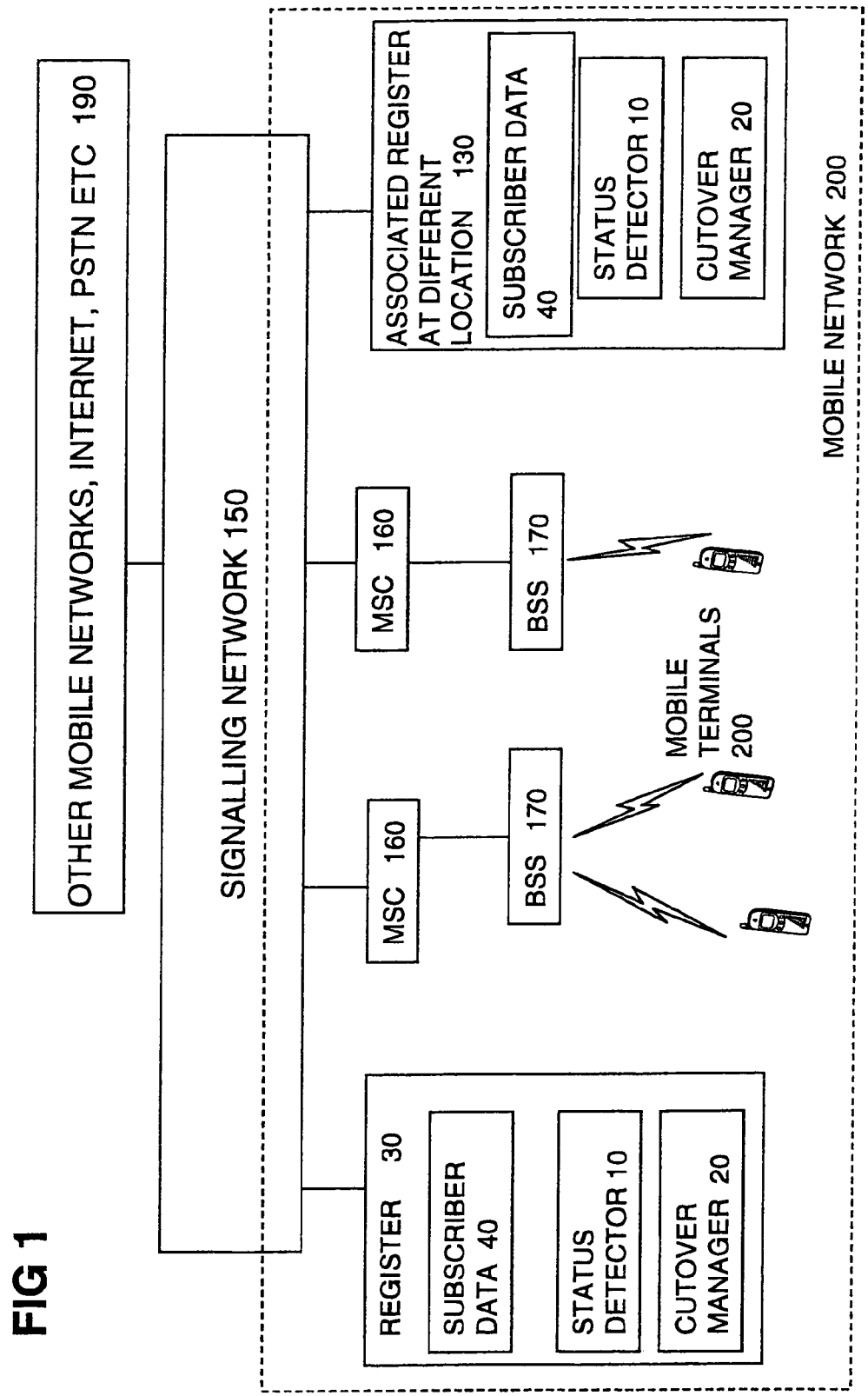
FIG. 1 shows an overview of parts of a mobile communications network including registers.

FIG. 1 shows an overview of parts of a mobile communications network including registers according to embodiments of the invention. The mobile network 200 can be any kind of network including, GSM, UMTS, TDMA (time division multiplexed access) and so on. A signaling network 150 is used for passing messages between the elements as described above. It can be an SS7 network having STPs, or any other type of signaling network having similar features, though only SS7 embodiments are described here. The register 30 can be used for storing any kind of data, such as subscriber data 40 involved in setting up and processing connections or calls or packets over the mobile network. The subscriber data is typically split into permanent data such as subscription details, and temporary data such as current location information. It can be a location register such as a home location register or visitor location register for example, though conceivably it can be other types of registers such as those having secure information related to subscriber identity or billing information. The register is paired or mated with an associated register to provide geographical redundancy. The register includes a status detector 10 for detecting a failure of the associated register 130, and a cutover manager 20, for deciding to carry out the cutover, depending on the detected status and optionally on other criteria. The associated register has similar elements.

The mobile network includes one or more MSCs 160, for switching connections, calls or packets from mobile terminals 200, to other terminals or other networks 190 such as the PSTN (public service telephone network), other mobile networks, or the internet. The MSC is coupled to the signaling network, and to a base station system 170. The MSC accesses data in the register by sending messages over the signaling network.

As shown in FIG. 2, the status detector is arranged to send messages at step 205 to its paired register to determine if it is failing to respond. The messages are addressed using conventional actual or pseudo SS7 addresses allocated for use by all the network elements. At step 215 the status detector detects messages returned by the signaling network as being undelivered. Status is confirmed and unnecessary cutovers avoided, by trying to send messages to the associated register via other paths and providing a delay before enabling the cutover and by acting on any feedback from the network. At step 225, the cutover manager uses the detection of returned messages to enable a cutover operation to be triggered more reliably than if a lack of response is relied on.

FIG. 3 shows subsequent steps carried out by another embodiment of a cutover manager. At step 335, it verifies the status at step 335 by testing other criteria, such as whether other routes to the mate have failed, as described below. At step 345 the cutover manager analyses results to make a cut over decision. Examples of how to implement these steps in more detail will be described below.

In the context of a GSM network and an SS7 signalling network, the mated pair configuration of the HLR provides full geographical redundancy to a pair of mated HLRs in the GSM network. The auto cutover feature enables an HLR in a mated pair to automatically determine if a disaster has happened and automatically cutover to the mate HLR if the cutover criteria are met. There is provided the ability to set up Autocutover (ACO) configuration using variable parameters. ACO detects a disaster automatically and determines whether an automatic cutover is necessary. Note Autocutover is sometimes referred to as Autofailover.

There are also situations in which the cutover manager is arranged not to cutover, e.g.:

Failure of all links from a single STP to HLR i.e. one route removed but other paired STP is still alive.
Failure of some of the links
STP maintenance
Network congestions
Failure of one of a pair of STPs.
Transient failure of all links from STP to HLR. (this may warrant a cutover dependant on configured parameters).

To perform an autocutover, each HLR detects that a disaster has occurred on the mate HLR and tests the authenticity of the detection mechanism by taking action to verify if there is a need to provide an autocutover. The aim of ACO is to ensure the surviving node of a disaster is set to a standalone status, in which all HLR messages in the network are handled by the surviving node. After cutover the surviving node provides service for the subscribers belonging to the mate HLR and continues to provide service for its set of home subscribers.

The operation of Automatic Cutover (ACO) will now be introduced. Each HLR in the pair sends heartbeat messages to the other, each of which should trigger a return acknowledgement message. In the event that the mate HLR is unreachable and the network STP returns the heartbeat message to the originating HLR ("echoed" message), the HLR begins a verification action in the form of SLS cycling. SLS cycling is an attempt by the HLR to establish whether communication with the mate has truly been lost. A heartbeat message is sent to the mate along every possible link by cycling through all 256 possible SLS values. If any message is acknowledged by the mate then cutover will not occur and the HLR ACO process returns to the Heartbeat state. If the SLS heartbeat messages are returned undelivered, also termed "echoed", and a threshold of numbers of returned messages is met then cutover is possible and the ACO process progresses to another verification action, such as a check for network isolation. This threshold is configurable and must be exceeded over all cycles as discussed below, to enable the cut over decision to be adapted to conditions in specific networks.

The isolation check is to ensure that the HLR does not cutover if it is isolated from the rest of the network. It does this by checking for network activity during the SLS cycling state. If there is no network activity (e.g no UL, (Update location) SRI (send routing info) or other messages received from the network) during that time then cutover will be aborted and ACO will return to Heartbeat state. More details of these actions will be described below.

ACO manager features include the functionality being configurable for various network circumstances. The configurable parameters enable cutover characteristics of the mated pair to be optimised for operational network conditions and to reduce false cutover events. The autocutover can be disabled, that is switched ON or OFF. It has a mechanism that allows the operator to set auto-cutover to a "monitoring" mode, i.e. the detection mechanism continues to operate, but physical cutover mechanism is suppressed. Other configurable parameters can include the number of cycles to perform over the SLS values, which is used to increase the reliability or confidence of the measurements, since more messages are sent or they are sent over a longer period. Another configurable parameter can be the rate of sending messages during cycling, for similar reasons. Another configurable parameter is the minimum enforced SLS cycling analysis time, which is a guard to prevent premature cut over due to (for example) the STP switching back to its low cost route.

The ACO manager uses the detection of a disaster and makes an informed decision of whether the mate HLR is down. This is done by gathering information at the HLR from the SS7 network to detect the status of the mate HLR. Logs can be displayed showing the ACO information and statistics that have been monitored and gathered. Alarms at the maintenance position are raised when automatic cutover has been invoked.

Cutover is automatic but cutback is preferably a manual procedure. This implies that when the functional HLR undergoes automatic cutover, the non functional HLR must be manually removed from the network to prevent it from recovering and resuming network activity. Cutback requires recovery of node, re-syncing of data and verification. Cutback should be a controlled event, not occurring in the busiest hours for example.

Each Heartbeat message is governed by HLR Data Transport Service (DTS) Requestor. A timer for DTS is specified so that Standby and heartbeat messages will timeout. Cutover is an emergency, instantaneous event.

FIG. 4 shows an example in the context of an SS7 signaling network having STP1 and STP2 coupled to each of the registers HLR1 and HLR2. Route $L_{11}$ couples STP1 to HLR1, route $L_{12}$ couples STP1 to HLR2, route $L_{21}$ couples STP2 to HLR1, and route $L_{22}$ couples STP2 to HLR2. Route $L_c$ couples STP1 to STP2. This is illustrated dotted to show it is an optional link.

To ensure heartbeat messages are echoed back to the sending HLR, each HLR is set-up with an alias routeset containing linksets to STP1 and STP2 (combined linkset). HLR to STP translations are MTP (message transfer part) destination point code only to ensure that the DPC (destination point code) is the PC of the STP but the Heartbeat GT (global Title) remains in the SCCP (signaling connection and control part) portion of the message. To ensure that messages can be sent from the HLR to the STPs using an alias route set, the STPs must have capability codes defined which are equal to the point codes associated with the alias route set. STP to HLR translations are SCCP point code and signaling subsystem number to translate to a final destination.

The ACO operates with no intermediate nodes between the HLR and the STP. The auto cutover functionality assumes that the global title translations are set up in the STP for handling HLR heartbeat traffic to ensure an "echo" is returned, in other words the message is returned to sender if undelivered. A number of standard configurations of STP 1 and STP 2 are possible, and the operation in each case will be described with reference to FIGS. 5 and 6.

Figure 5:
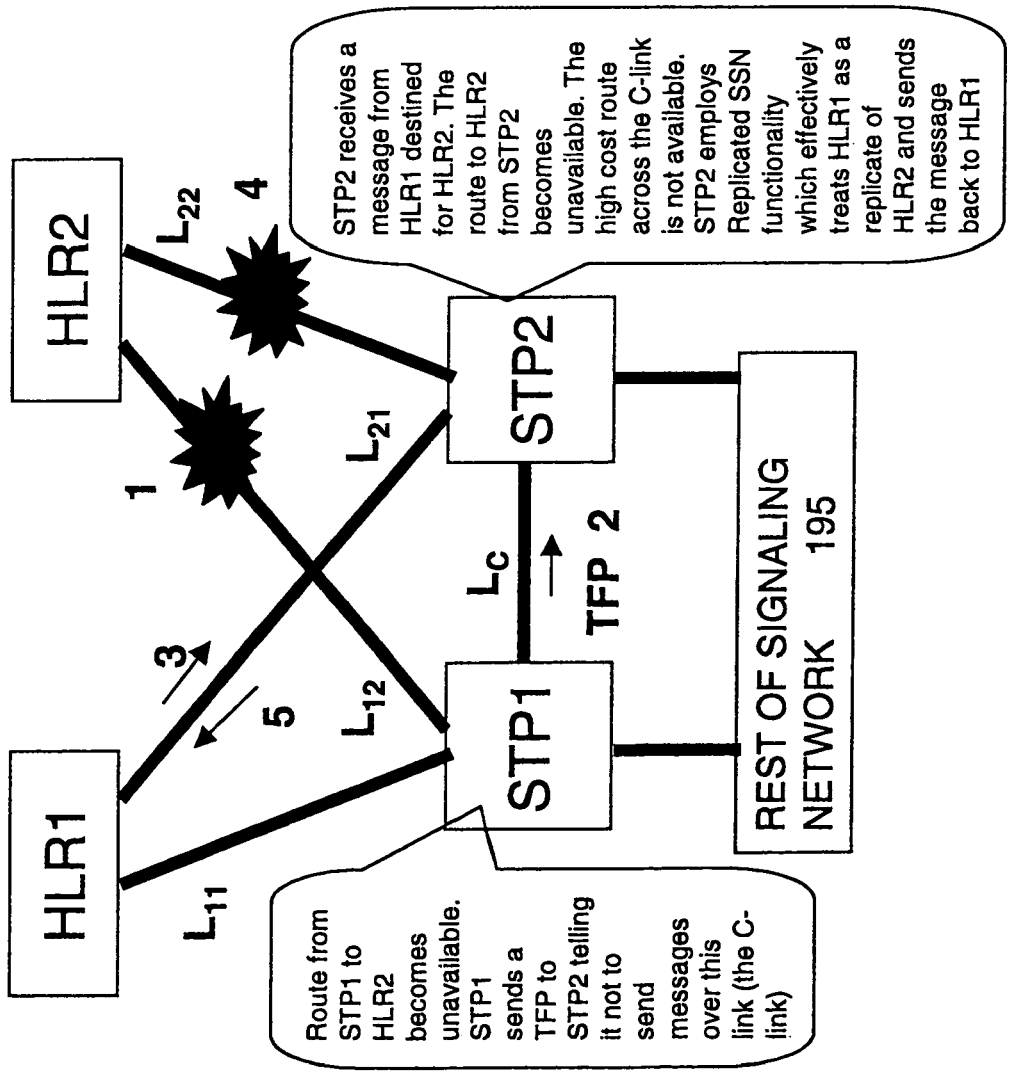

There are basically two configurations of the Primary Level STP Network. FIG. 5 shows operations in a first configuration in which STP1 and STP2 have replicated SSN functionality. In this case C-links operate between the STPs and the STPs implement a scheme where they are able to inform the other STP of a failure on a remote route to an HLR shown by item 1. In FIG. 5, a TFP (Transfer Prohibited) is sent to the partner STP, STP 2, shown by arrow 2. If a message shown as arrow 3 cannot be routed by the partner STP along the low cost route, $L_{22}$, owing to a fail in this route, shown by 4, the high cost route to HLR2 would be to try the C-link. However, as a TFP has been received by STP2, STP1 does not bother sending the message over the STP C-link and uses Replicated SSN functionality to route the message back to the originating HLR, HLR 1, shown by arrow 5. For this configuration, the Replicated SSN functionality causes the echo. The address used to route heartbeat messages to the other HLR could be the same as the "actual" address of the mate HLR.

Figure 6:
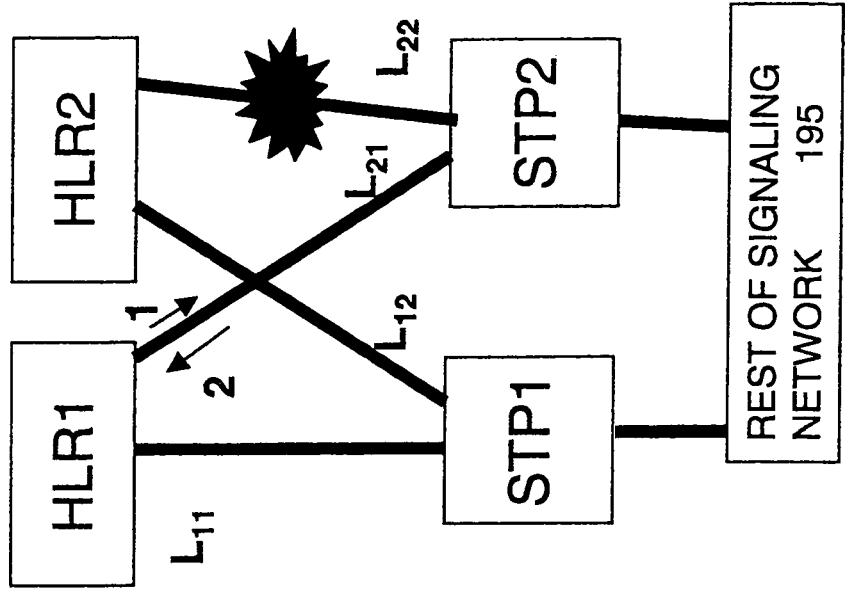
FIGS. 5 and 6 show the operation of the embodiment of FIG. 4 under different STP configurations.

FIG. 6 shows an example where there are no C-links between the STPs. For this configuration the high cost routing causes the echo. A heartbeat message 1 sent from HLR1 shown by arrow 1, is returned by STP2 as shown by arrow 2.

FIG. 7 shows a sequence chart showing examples of messages sent in normal operation. In the first line, a conventional Sync message is sent between the HLRs and acknowledged. A heartbeat message is shown using a TCAP BEGIN message with HLR1 id entered as value #AA. A corresponding acknowledgement is sent back using a TCAP end message. Next is another sync sequence, then a network message is sent from an MSC or other network element to the HLRs. It is shown as being diverted by HLR1 to HLR2. Another heartbeat sequence follows, but in the other direction, from HLR 2 to HLR1. This message contains the heartbeat id (#BB). The period between heartbeats can be configurable, and can be dependent on whether any sync messages are being sent.

FIG. 8 shows a sequence chart showing examples of messages sent when all routes to one of the HLRs are out of service. A heartbeat message from HLR2 is echoed back to HLR2. This causes HLR 2 to detect a potential fail and begin verifying this by trying other routes using the SLS cycling process. Meanwhile network messages to HLR1 are rerouted by the signaling network to HLR2 using the higher cost route. As the cutover has not happened yet, HLR2 tries to divert them back to HLR1. The diverted messages are echoed back to HLR2. HLR2 notes an increase in rerouted messages and echoed diverted messages, which is optionally used to verify the potential fail. Next sync messages from HLR2 are shown as being echoed back to HLR2. This is optionally used as further evidence of the failure of communication with HLR1. Further verification before cutover could result in not proceeding with cutover in the following cases for example:

Isolation Check Failed or

Threshold of number of echoed messages not met over all Cycles, as explained in more detail below.

FIG. 9 shows a sequence chart showing examples of messages sent when all routes to one of the HLRs are out of service for a short time, a transient failure. As in FIG. 5, network messages for HLR1 are re routed to HLR2. Then a heartbeat message from HLR2 is echoed back to HLR2. This causes HLR 2 to detect a potential fail and begin verifying this by trying other routes using the SLS cycling process. One of these uses a route which has now reentered service after the transient failure, and HLR1 is able to send a heartbeat acknowledge back to HLR2. This stops the verification and clears the potential fail status. An unwanted cutover has been averted.

The time to cutover is=Time to Send all messages+ Heartbeat Period+Wait Time after SLS Cycling.

This time to Cutover depends upon Configured Parameters. An example of a minimum time to cutover when minimum SLS Message Time=10s, No of SLS Cycles=1, No of Heartbeat Global Titles=1, and Rate of SLS Messages=16 is 16+1+1=18 seconds.

Figure 10:
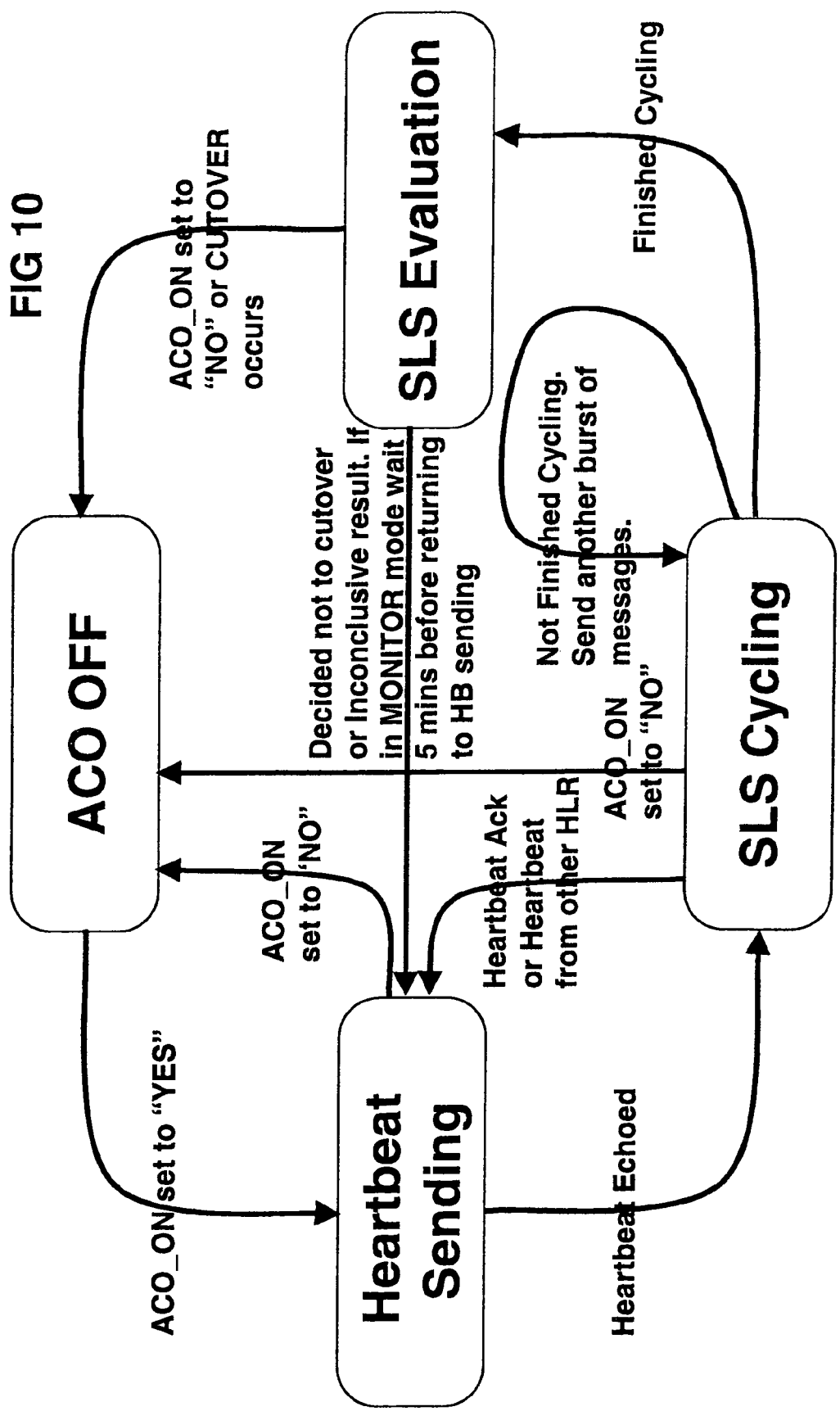
FIG. 10 shows possible state transitions of the ACO manager.

FIG. 10 shows possible state transitions of the ACO manager. The states are Off, Heartbeat sending, SLS cycling, and SLS evaluation. ACO remains in the OFF state until a change which could be triggered by a configurable timer for example. The next state is the heartbeat sending state. The ACO state machine can get to this state from the ACO_OFF state and from the SLS_Evaluation state. During this state a single heartbeat message is sent out to indicate to the mate that this HLR is active. This is the normal operating state in which ACO remains until one of the heartbeat messages sent out is echoed. An echoed heartbeat message is an indication that connectivity to the mate HLR is lost on the route chosen by that heartbeat message and the STP returns the HB back to the originating HLR. The heartbeat message is a new message introduced for AutoCutover. The heartbeat message is an indication to ACO on the mate HLR that the sending HLR is still alive. When the datafill for the ACO has been completed correctly on both HLRs the operator should observe that the heartbeats are sent by each of HLRs in the mated pair and that the mate HLR responds to a received heartbeat.

The heartbeats are sent out from both HLRs typically at a rate of 1 HB per second. Heartbeats are also sent in SLS Cycling. In this state checks are also made continuously for any changes in the control data for which can lead back to the ACO_OFF state or to the next state SLS cycling and result accumulation if a heartbeat is echoed.

The first heartbeat echoed from the mate during "Heartbeat sending" indicates there may be a problem with the mate HLR. This indication is the trigger to enter the SLS cycling state. The main function of the SLS cycling state is to test every route to the mate HLR before making a decision to enable cutover. This can be used to give reassurance that an echo is not an isolated event which would not justify a cut over. The cycling should last more than a minimum time for the STPs to switch back, as governed by the operator configurable data as described above. Heartbeat messages are sent into the network on every route to the mate HLR to ascertain whether it is possible to communicate with the mate HLR via the network. The messages are sent at N messages in 1 second, where N is the SLS Rate which is configurable. The total number of Heartbeats sent during SLS cycling is shown in the following calculation example: For 1 global title and 5 SLS_NC Total number of messages to send for SLS cycling=256*1*5=1280 messages to send In the above example the HLR undergoing SLS cycling will send out bursts of N messages per second until all 1280 messages have been sent. Only when all messages are sent and accounted for then a decision on whether to cutover is taken. Each heartbeat message is sent on a different logical route. The actual route which is chosen to send each message out on is provided by the SLS in a combined linkset implementation at the DMS HLR. The SLS provides the logical link to physical link mapping, which then determines the route that the heartbeat uses. If an echo is received on a SLS value, this is good evidence that the route from the STP to the mate HLR has switched over. However testing the "other" route to the mate is not possible so all SLS values must be tested for communication to the mate HLR. If an HLR has multiple point codes, then even more SLS values need to be cycled through.

SLS cycling is stopped if a heartbeat is received from the mate HLR or a HB ack is received from the Mate HLR. This is considered as an indication that the communication with the mate HLR is still possible. After SLS cycling and data collection ACO moves into the SLS evaluation state.

The SLS evaluation state is the only state in which the HLR can actually cutover to standalone operation. This state involves first checking the results accumulated in the SLS cycling state and evaluating whether a cutover is necessary. A decision to cutover is based on the Echoed Messages Threshold. Provided the percentage of Heartbeats echoed is greater than or equal to this parameter then the cutover path will be followed. The cutover path begins with the pre cutover check. Thereafter the cutover path is followed. Then the post cutover actions are executed, such as isolating the failed HLR so as to be able to restore it in a controlled manner.

Before a cutover can proceed ACO ensures that the node that is doing the cutover is not isolated. Checks are be made for node isolation to prevent cutover in a isolated node. This pre cutover check is a simple test to check for network activity before cutting over. A node that is active and running should be accepting network messages and responding to them. Examples of the types of operational measurements that are checked for activity are:

Send Routing Info Message,

Update Location,

If the node is active at least one of these transactions should have occurred during the SLS cycling period. If this is the case the active node passes the Pre-Cutover check. An HLR isolated from the network will not process network messages and fails this check and ACO goes back to the Heartbeat Sending state. If in monitors mode, a delay is inserted before returning to heartbeat sending state, to give an operator an opportunity to analyse the results of SLS cycling before the system begins sending heartbeats again.

If precutover check passes then Cutover commences. Cutover actions include

Turning on an alarm to indicate cutover to an operator.

Make configurational changes to the HLR for standalone operation.

Generate all necessary logs indicating statistics gathered during cutover.

The ACO manager can be placed in a monitoring position in which cutover is disabled. ACO will never cutover in MONITOR mode although SLS cycling occurs. This ensures that the ACO can be monitored without having a physical cutover. The ACO feature can go into Cycling when a single HB is echoed. There is a 5 minute delay period in MONITOR mode before going back to the Heartbeat Sending from SLS cycling. This 5 minute delay ensures that Heartbeat Echoes and SLS Cycling do not continuously occur, as it is an intensive phase of the ACO and should be avoided unless a real disaster is occurring.

FIG. 11 shows the operation of the status detector, in the form of an initial failure detection by echoed heartbeat, in more detail. The HLR1 includes a heartbeat service requester and a heartbeat service provider for receiving and detecting the echoes. At step 1, HLR1 sends a heartbeat to HLR2 and starts a new transaction. At step 2, the STP has cutover, so echoes the heartbeat back to HLR1. At step 3, the HLR1 service provider treats the echoed message as a new second transaction. On inspection of the HB message, it recognises that the HLR-id is HLR1. At step 4, HLR1 sends back a Return Code indicating that "message is echoed". At step 5, it is recognized that this is a local message and need not go via the signaling network. The second transaction is ended. At step 6, the heartbeat service requester realizes that the message has been echoed and starts verification in the form of SLS cycling.

The heartbeats or heartbeat acknowledgements can be sent at higher priorities than other messages, to ensure a higher chance of the message and its acknowledgement being delivered successfully during periods of high congestion for example. The HB message can uses DTS, Data Transport Service protocol. Essentially the DTS protocol uses blue book SCCP to transfer data in standby and heartbeat messages. To ensure efficiency of message transport between the mated pair HLRs the DTS protocol departs from the use of ASN.1 Basic Encoding Rules.

FIG. 12 shows a bytewise graphical representation of an example of a heartbeat message. It shows the MTP portion of the message as decoded, with the SCCP TCAP and proprietary application portion encoded in hexadecimal. The last line starting 1C is the start of the proprietary application portion. The circled parts are of particular interest, other parts are routine tag and length information. It has a generic DTS data part and a specific heartbeat data part. The DTS data part includes a proprietary op code, 1C, then a sequence tag 30, then a sequence length 08, a tag identifying the user of the application data, C4, a user length, 01, a user value 03, which indicates that the user of DTS is "heartbeat application", a tag indicating a DTS user defined portion, C5, and a length 03. The specific heartbeat data includes a protocol version 01, a message group, 00, and an HLR identifier, BB. For heartbeat messages sent by the mate HLR, the message format would be the same, but a different HLR identifier would be used, for example AA is used in embodiments described above.

The HLR_id gives an indication as to the HOME partition of the HLR sending out the heartbeat. The HOME and AWAY partitions can both be defined. If the HOME partition is 1 then #AA is sent in the HB. If the home partition is 2 then #BB is sent in the heartbeat for example. The heartbeat acknowledgement can have a similar structure to that shown in FIG. 12, but adapted to carry different information. Examples of information sent in the heartbeat acknowledgement can include: Heartbeat OK, Mate HLR in Standalone Mode, User Time Out, UDTS, Heartbeat Message Echoed. These examples will be explained briefly. Mate HLR in standalone mode means the mate is in standalone mode, and causes a log entry to warn the operator of this potentially damaging situation. User time out is an indication that a timer in the sending HLR has timed out and means no response has been delivered. UDTS unit data service is an indication of congestion somewhere in the network.

Concluding Remarks

As described above, a location register for a mobile communications network is coupled by an SS7 network for passing messages, has a mated location register at a different location to provide geographical redundancy, and has a status detector for detecting a status of the associated register, by sending a heartbeat message to the associated register. It deduces a fail if the message is returned by the signaling network. A cutover manager is arranged to enable a cutover on the basis of at least the detected status. By providing a more positive detection of a failure than merely passively interpreting a lack of response to the heartbeat, false triggering of cutovers owing to transient failures or temporary congestion, can be reduced. The cutover manager can verify the status by sending other messages by other routes, or using other criteria.

Other variations will be apparent to those skilled in the art, having corresponding advantages to those set out above, within the scope of the claims.

The invention claimed is:

1. A register for a mobile communications network having a signaling network for passing messages, the register being associated with another register at a different location to provide redundancy, the register having:
   a status detector arranged to detect a status of the associated register, by sending a message to the associated register and detecting if the message is not delivered by the signalling network, and
   a cutover manager arranged to enable a cutover on the basis of at least the detected status of the associated register.

2. The register of claim 1, being arranged to confirm the status of the associated register by sending another message by another route.

3. The register of claim 2, being arranged to try sending messages by all other links on all routes to the associated register in the event of a message being returned as undelivered.

4. The register of claim 1, the cutover manager being arranged to determine whether to cutover according to other criteria including at least one of the following: signaling network failures, network congestion, isolation of the register from the signaling network, transient failures, and manual disabling of cutover.

5. The register of claim 1 being configurable to adjust how many returned messages are needed before the cutover is enabled.

6. The register of claim 1, having a configurable delay before the cutover is initiated.

7. The register of claim 1, the message having an indication of the identity of the sending register.

8. The register of claim 7, the message having an application part and a signaling transfer part, the identity being contained in application part.

9. The register of claim 1, the signaling network being an SS7 network, having one or more signaling transfer points, and the signaling address being a signaling point code.

10. The register of claim 1 arranged to respond to a status message from the associated register by sending a status acknowledgement message including status information.

11. The register of claim 1 comprising a home location register, for processing subscriber messages.

12. A register for a mobile communications network having a signaling network for passing messages, the register being associated with another register at a different location to provide redundancy, the register having:
 a status detector arranged to detect a status of the associated register, by sending a message to the associated register by a first path through the signalling network, then if the message is not delivered, verifying the status by sending a message to the associated register by a second path through the signalling network and
 a cutover manager arranged to enable a cutover on the basis of at least the detected and verified status of the associated register.

13. A method of performing cutover between a first register and a second register at a different location in a mobile communications network, the first register being associated with the second register to provide redundancy, the mobile communications network having a signaling network for passing messages between the first and second registers, the method comprising:
 detecting the status of the second register, by sending a message from the first register to the second register and detecting if the message is not delivered by the signalling network, and
 performing cutover on the basis of at least the detected status of the second register.

14. Software in machine readable form for a register for a mobile communications network having a signaling network for passing messages, the register being associated with another register at a different location to provide redundancy, the software having:
 code arranged to detect a status of the associated register, by sending a message to the associated register and detecting if the message is not delivered by the signalling network, and
 code arranged to enable a cutover on the basis of at least the detected status of the associated register.

* * * * *